June 11, 1935.　　　　R. H. CHILTON　　　　2,004,519

FLEXIBLE METAL ICE TRAY

Filed July 27, 1934　　　　2 Sheets-Sheet 1

INVENTOR
Ralph H. Chilton
BY Spencer Hardman & Fehr
his ATTORNEYS

June 11, 1935.                R. H. CHILTON                2,004,519
                         FLEXIBLE METAL ICE TRAY
                    Filed July 27, 1934        2 Sheets-Sheet 2

INVENTOR
Ralph H. Chilton
BY
Spencer Hardman & Jehr
his ATTORNEYS

Patented June 11, 1935

2,004,519

UNITED STATES PATENT OFFICE 2,004,519

FLEXIBLE METAL ICE TRAY

Ralph H. Chilton, Dayton, Ohio, assignor to General Motors Corporation, Detroit, Mich., a corporation of Delaware Application July 27, 1934, Serial No. 737,181

9 Claims. (Cl. 62—108.5)

This invention relates to freezing containers or ice trays especially such as are adapted for home use in electric refrigerators.

Flexible freezing trays of resilient rubber are now in wide use and satisfactorily meet the requirement of easy removal of the frozen ice blocks therefrom. However there are various objections to rubber ice trays, as follows: (1) rubber and other non-metallic materials are poor conductors of heat and hence such trays require a considerably longer freezing time than metal trays; (2) rubber trays are molded and the cost of material and manufacture is normally considerably higher than the cost of the same size metal tray; (3) rubber trays are much more difficult to keep clean and sanitary than are metal trays.

Now an object of this invention is to provide a simple form of metallic freezing tray which is readily flexible to permit the removal of its frozen contents without melting same loose by bending, twisting, or otherwise distorting the metal pan to loosen the bond of the contained ice therewith.

A feature of this invention is the provision of flexible expansible corners on the metal water pan which permits the pan to be quite easily twisted or flexed as a unit even though it be filled with an incompressible mass (such as that of the contained ice) which does not permit any corner of the pan to move inwardly from its normal position. The main areas of the metal side walls and metal bottom of the pan can thus be made plain, that is without corrugations or other irregular shapes to produce flexibility thereof, and still the entire pan taken as a unit will have a large degree of flexibility due to the expansible corner portions thereof. When the pan is filled with a frozen ice block or slab bonded by freezing to the plain metal bottom and side walls thereof, only a slight flexing or twisting of the pan is required to loosen the frozen bond between the ice and said plain uncorrugated metal bottom and side walls. In other words there are no projections on the main areas of the bottom and side walls which interlock with the ice slab and limit relative peeling movement between these walls and the ice to oppose the flexing of the pan as a unit.

Another object of the invention is to provide such a partitionless metal water pan and a separate flexible rubber grid member insertable therein, which grid member has flexible partition walls extending approximately diagonally across said pan and thus forming lines of easy cleavage of the frozen ice slab when the metal pan is flexed from corner to corner by twisting as shown in Fig. 5. With this combination of pan and grid the twisting of the pan will not only loosen the pan from the contained ice slab but very often the slab of grid and ice will be cracked diagonally across at these lines of relatively easy cleavage and thus the force necessary to twist the entire unit is materially lessened.

Further objects and advantages of the present invention will be apparent from the following description, reference being had to the accompanying drawings, wherein a preferred embodiment of the present invention is clearly shown.

Figure 3:
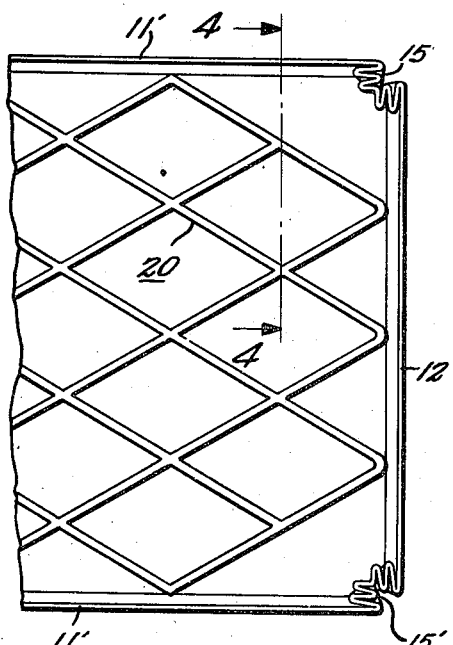
Fig. 3 is similar to Fig. 1 and shows how the expansible corners of Fig. 1 may be expanded to permit the outward movement of the metal side walls when the pan is twisted or otherwise distorted to loosen it from the contained ice.
Figure 4:
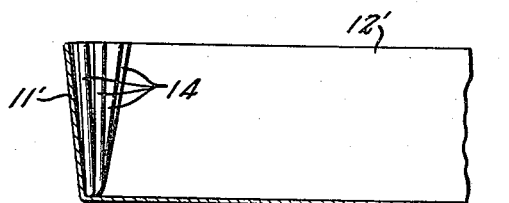
Fig. 4 is a section on line 4—4 of Fig. 3 but omitting the grid.

Figs. 3 and 4 also illustrate a modified form of tray having outwardly inclined side walls shown in their normal or unexpanded position.

Figure 1:
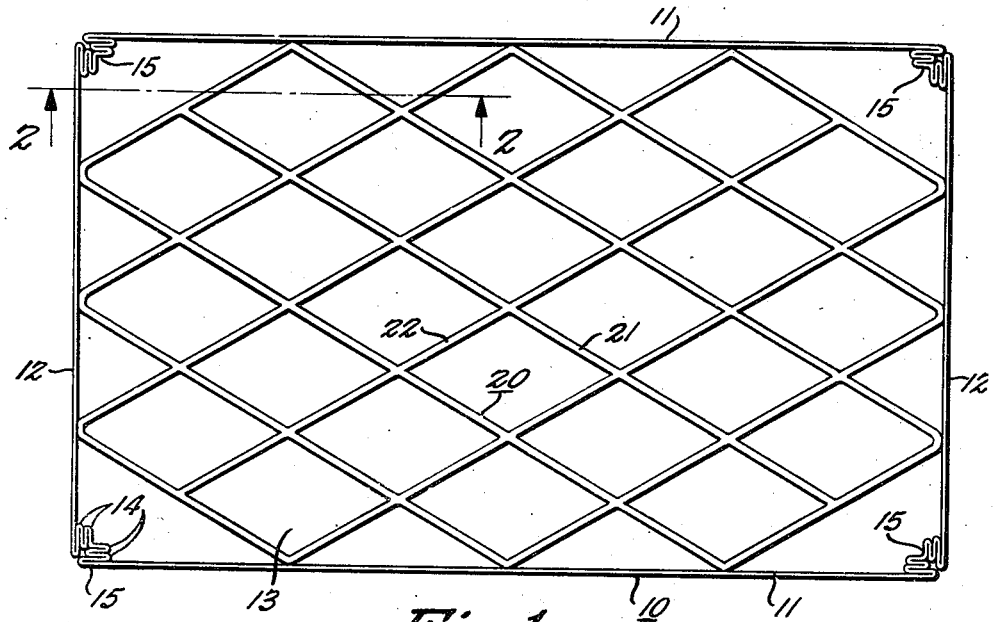
Fig. 1 is a plan view of a flexible metal water pan and removable grid therein made according to this invention.
Figure 5:

Fig. 5 is a perspective view showing how the pan of Figs. 1 and 3 may be bent back about a diagonal line extending from corner to corner due to the expansibility of the corners of the pan.

Figure 6:
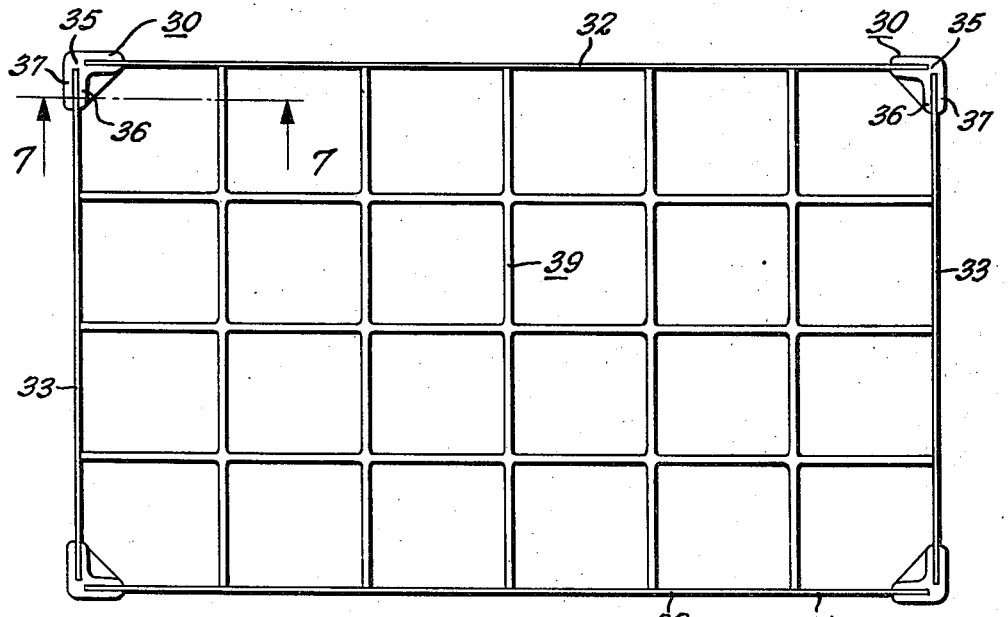

Fig. 6 is a plan view of a modification showing a resilient rubber expansible corner.

Figure 7:
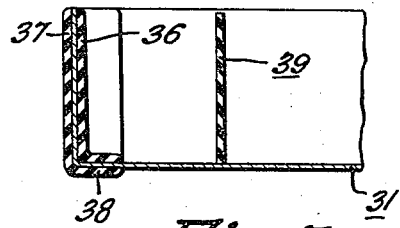

Fig. 7 is taken on line 7—7 of Fig. 6.

Figure 8:
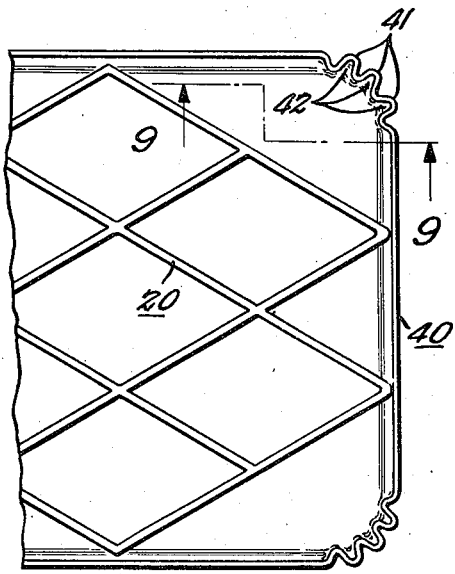

Fig. 8 is a plan view of a further modification showing corrugated rounded expansible corners on the pan.

Figure 9:
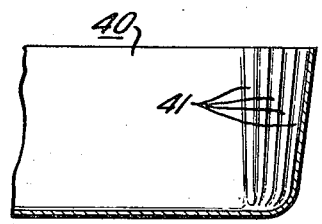

Fig. 9 is a section on line 9—9 of Fig. 8.

Similar reference characters refer to similar parts throughout the several views.

Figure 2:
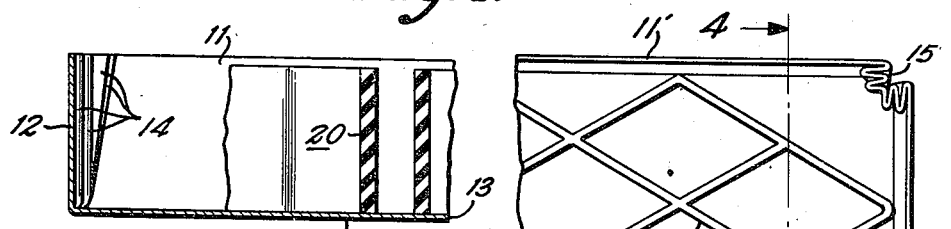
Fig. 2 is a section on line 2—2 of Fig. 1 and shows the downwardly tapering folds or corrugations in the metal at the expansible corner.

In the form shown in Figs. 1 and 2 the partitionless flexible pan 10 is bent up from flat sheet metal to provide upstanding side walls 11 and 12 integral with the substantially plain bottom wall 13. The excess metal area at the four corners is folded back and forth forming the downwardly tapered corrugations 14 which provides the four bellows-like expansible corners 15. Obviously these expansible corners 15 will permit the outward movement of each side wall 11 and 12 as shown at 11' and 12' in Fig. 3.

If the pan 10 be filled with a solid frozen ice slab bonded by freezing to the surfaces thereof, the side walls 11 and 12 may be easily loosened from the ice slab by any force tending to flex them outwardly as shown in Fig. 3, and the bottom wall 13 can be easily loosened from the ice slab by twisting it about a diagonal line. It will be noted that either two diagonally opposed expansible corners 15 will readily permit the twisting of pan 10 about a diagonal line since the upstanding side walls 11 and 12 have little or no stiffening effect about such a diagonal line. The twisting of pan 10 about a diagonal line will progressively loosen the solid ice slab from the side walls 11 and 12 also from the bottom wall 13, since any twisting force on pan 10 tends to open up at least two opposed expansible corners 15. Perhaps this can be better seen by the following: If a similar pan be made of flexible sheet metal but with non-expansible corners it can be twisted a slight amount when empty, but when filled with a solid slab of ice bonded thereto it will be very rigid. Such rigidity is due to the fact that to twist the filled pan the side wall portions adjacent the two diagonally opposed high corners must move materially inwardly (that is against the ice slab) but since the non-compressible ice slab prevents such inward movement no twisting of the pan can occur without crushing the ice or breaking it out at these two opposed high corners. However if these two high corners are expansible it is not necessary that the side walls move inwardly against the ice slab to permit such twisting. The expansible corners will be merely forced to expand or open up the required amount to permit the twisting. Only a very slight relative movement of the side walls 11 and 12 upon the ice slab will loosen the side walls from the ice and thereafter the twisting of the pan 10 will be greatly facilitated.

Preferably a removable flexible grid 20 is inserted in pan 10 to divide the ice slab into a series of blocks of convenient size for table use. After the ice slab is removed from the metal pan 10 the flexible grid 20 may be readily flexed by hand to remove the individual ice blocks therefrom.

Preferably but not necessarily the flexible grid 20 is made of resilient rubber having one or more of the vertical partition walls thereof extending in a substantially diagonal direction. For instance in the grid 20 shown in Fig. 1, the partition wall 21 extends in one diagonal direction while the partition 22 extends in the other diagonal direction. The remaining partition walls are shown as being parallel to these two diagonal walls. Now when the metal pan 10 with grid 20 and ice slab frozen therein is twisted as illustrated in Fig. 5, the diagonal rubber partition walls 21 and 22 will provide lines of relatively easy cleavage diagonally across the ice slab which permits the ice slab to be more readily broken along these lines. After the ice slab is broken along the two long diagonal partitions 21 and 22, the entire unit of pan and contained ice may then be twisted to and fro to loosen substantially all the individual ice blocks. It is thus seen that the diagonal rubber grid 20 and the metal pan 10 with expansible corners 15 form an especially advantageous combination. However pan 10 may be twisted free from a solid ice slab without breaking same (as described hereinabove) and hence may be advantageously used with any form of removable grid or with no grid at all.

Figs. 1 and 2 show the side walls 11 and 12 extending vertically from the bottom wall 13. A second form of the invention is shown in Figs. 3 and 4, wherein the side walls 11' and 12' incline outwardly when in their normal or unexpanded position in order to facilitate the separation of said side walls from the ice slab when the pan is twisted.

Figs. 6 and 7 illustrate a third form of the invention wherein the expansible corners 30 are made from separate corner pieces of resilient rubber bonded or fixed otherwise to the contacting metal sides and bottom so as to prevent leakage of the liquid contents. The pan 31 is made from flat sheet metal by turning up the side walls 32 and 33 and the excess metal areas at the corners are cut away leaving a slot 35 at each corner. The molded flexible rubber corner pieces 30 are molded to be slipped upon and fit tightly over the adjacent edges of the side walls 32 and 33 so as to prevent leakage at these corners and yet provide expansible corners for the same purpose as described above. These rubber corner pieces 30 comprise an internal angle 36 and an external angle 37 connected by a neck of rubber lying in the slot 35. Preferably an integral bottom flap 38 is provided to underlie the metal bottom at the corner and so retain the rubber corner piece tightly against the metal bottom wall.

The removable grid 39 shown in Figs. 6 and 7 is an ordinary square mesh flexible rubber grid. In operation, the expansible rubber corner pieces permit the metal pan to be twisted as described above to free the ice slab together with grid 39 as a unit from the pan, after which the separate ice blocks are removed from grid 39 by flexing same by hand.

Figs. 8 and 9 illustrate a form of the invention similar to that of Figs. 1 to 4, with the exception that the metal pan 40 is drawn from flat sheet metal rather than folded up from flat sheet metal. The corrugations 41 in the bellows-like metal corners are shaped to provide easy expansion of these corners to free the metal pan from the ice slab by twisting or otherwise flexing the metal pan 40. In this form small ridges 42 of ice will freeze within the interior metal corrugations at the corners of the pan, but when the pan 40 is twisted as above described these small ice ridges 42 will either be sheared entirely off or the metal corrugations 41 will cam outwardly thereupon and thus permit the corners to expand the desired amount. If desired, these interior metal corrugations may be filled with a resilient material, such as rubber, to prevent the formation of the small ice ridges 42 and provide smooth rounded corners to the molded ice slab.

While the embodiment of the present invention as herein disclosed, constitutes a preferred form, it is to be understood that other forms might be adopted, all coming within the scope of the claims which follow.

What is claimed is as follows:

1. A freezing tray comprising: a flexible sheet metal pan having flexible corrugations in the metal side walls of said pan at the corners thereof which permit an outward movement of said side walls when said pan is filled with ice.

2. A freezing tray comprising: a flexible sheet metal pan having bent up side walls integral with the bottom wall thereof, the metal at the junction of two side walls being corrugated and providing an expansible corner which permits outward flexing of one side wall relative to the joined side wall.

3. A freeezing tray comprising: a flexible metal pan having a metal bottom wall and upstanding metal side walls integral therewith, and a flexible expansible corner interconnecting each pair of adjacent side walls.

4. A freezing tray comprising: a metal pan having a flexible metal bottom wall and upstanding flexible metal side walls capable of retaining the liquid contents to be frozen, each pair of adjacent side walls being connected together by a liquid-retaining flexible expansible corner, said expansible corners permitting the outward movement of each side wall as a unit relative to the normal position thereof.

5. A freezing tray comprising: a flexible metal pan having a metal bottom wall and upstanding metal side walls integral therewith, the corners connecting two adjacent metal side walls each having at least one upstanding flexible fold in the metal and providing an expansible corner for said two side walls.

6. A freezing tray comprising: a flexible metal pan having a metal bottom wall and upstanding metal side walls integral therewith, and a flexible expansible corner interconnecting each pair of adjacent side walls, said expansible corners having upstanding bellows-like corrugations in the metal thereof, said corrugations decreasing in width from the upper edge of said side walls downwardly.

7. A freezing tray comprising: a flexible sheet metal pan having flexible corrugations in the metal side walls of said pan at the corners thereof which permit an outward movement of said side walls when said pan is filled with ice, and a removable flexible grid insertable in said pan and releasable therefrom as a unit with the ice contents by flexing said flexible pan.

8. A freezing tray comprising: a flexible container having a flexible metal bottom wall and upstanding metal side walls having openings at the corners of said pan and providing expansible corners, and resilient rubber attached to said metal pan and normally closing said corner openings to prevent leakage.

9. A freezing tray comprising: a flexible container having a flexible sheet metal bottom wall and upturned metal side walls integral with said bottom wall, the excess sheet metal areas from the upturned side walls at the corners of said container being cut away leaving corner openings, and resilient rubber closing said corner openings to prevent leakage and providing expansible corners on said container.

RALPH H. CHILTON.